Oct. 24, 1939. J. VRTEL Re. 21,250

PAGE END SIGNALING DEVICE

Original Filed Feb. 25. 1937 3 Sheets-Sheet 1

Oct. 24, 1939. J. VRTEL Re. 21,250
PAGE END SIGNALING DEVICE
Original Filed Feb. 25, 1937 3 Sheets-Sheet 2
Fig. 2.
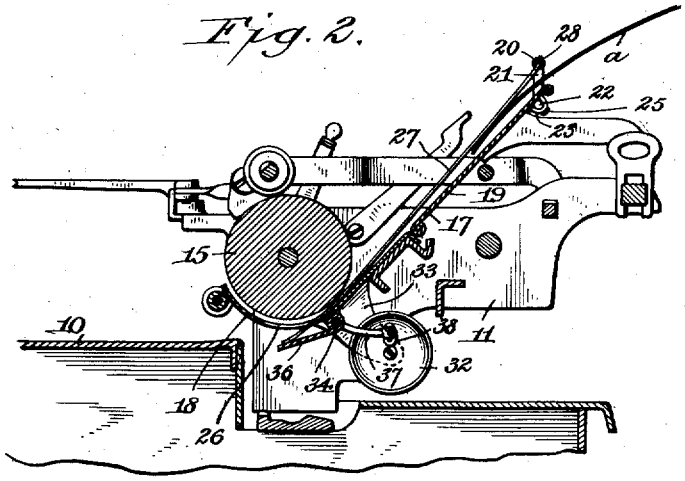
Fig. 5.
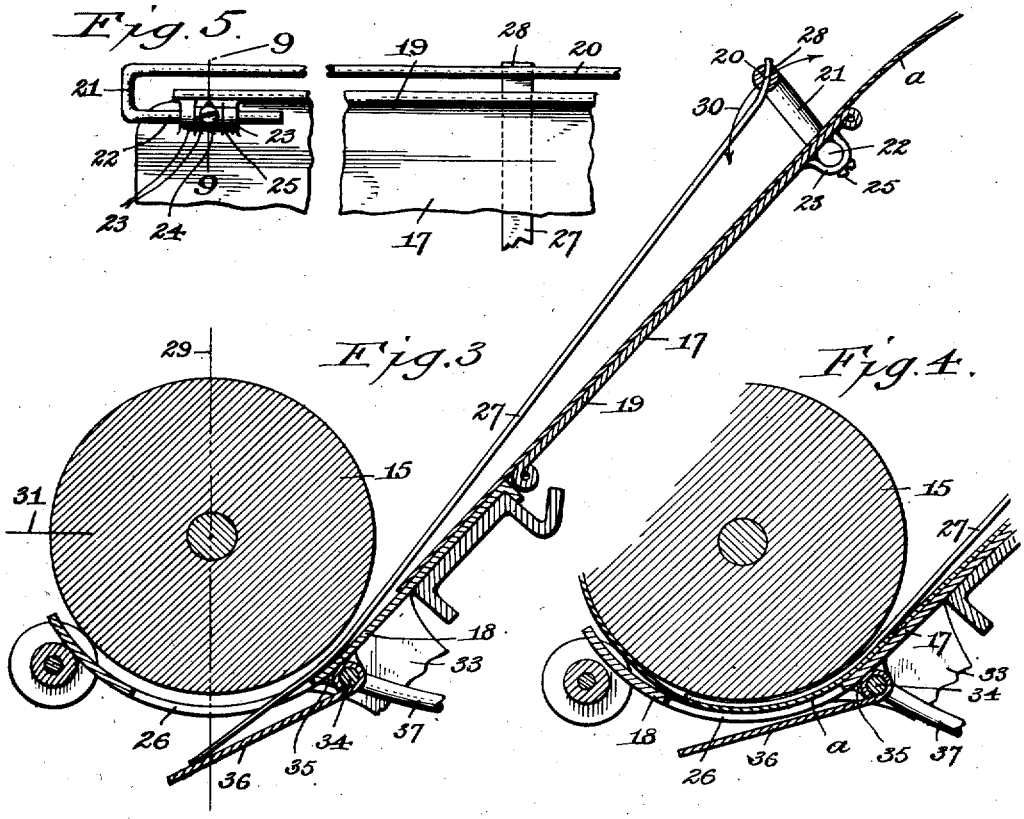
Fig. 3
Fig. 4.
Joseph Vrtel, Inventor,
By Emil Kuehert
Attorney.

Oct. 24, 1939. J. VRTEL Re. 21,250

PAGE END SIGNALING DEVICE

Original Filed Feb. 25, 1937 3 Sheets-Sheet 3

Joseph Vrtel,
Inventor.
By Emil Kuchar
Attorney.

Reissued Oct. 24, 1939

Re. 21,250

UNITED STATES PATENT OFFICE 21,250

PAGE END SIGNALING DEVICE

Joseph Vrtel, Buffalo, N. Y., assignor, by direct and mesne assignments, to L. C. Smith & Corona Typewriters, Inc., Syracuse, N. Y., a corporation of New York Original No. 2,148,715, dated February 28, 1939, Serial No. 127,646, February 25, 1937. Application for reissue June 22, 1939, Serial No. 280,440

15 Claims. (Cl. 197—189)

This invention relates to means for indicating the approach of the lower edge of a sheet during the act of typewriting upon the same.

In all typewriters, the lower edge of the sheet written upon is hidden by part of the sheet or parts of the machine, and it is a difficult matter to determine when the end of a page or sheet is approached so as to maintain a more or less uniform margin at the lower ends of the pages.

I am aware that certain devices have heretofore been designed to accomplish the result for which my invention is designed since it has long been known that a device accomplishing such a purpose would speed up the work of an operator and result in the production of neater work. Devices for this purpose heretofore designed have failed of adoption for the reason that they necessitated changes in the construction of the typewriter and required the services of a skillful mechanic in order to apply the same. Some of these devices previously designed necessitated changes in the typewriter, demanding the use of special machinery, such difficulties standing as a bar to the application of the devices to machines in use.

It is the object of my invention to provide a device of this kind which is simple in construction, inexpensive, and which can be applied to any make of typewriter now in use.

Another object of my invention is to construct my invention in the form of a unit capable of being substituted for a standard part of every typewriter, regardless of its make so that such unit can be easily replaced by one constructed in accordance with this invention, or one embodying the same.

A further object of my invention is to utilize the paper guide of a typewriter as the support for my improved page-end signaling device, and to so construct and combine the signalling device with the guide to enable the application of the device to the paper guide of any typewriter now being manufactured and in general use.

With the above and other objects in view to appear hereinafter, my invention consists in the novel features of construction and in the arrangement and combination of parts to be hereinafter described and more particularly pointed out in the subjoined claims:

In the drawings:

Fig. 2 is a transverse section taken on line 2—2 of Fig. 1, looking to the left.

Figure 1:
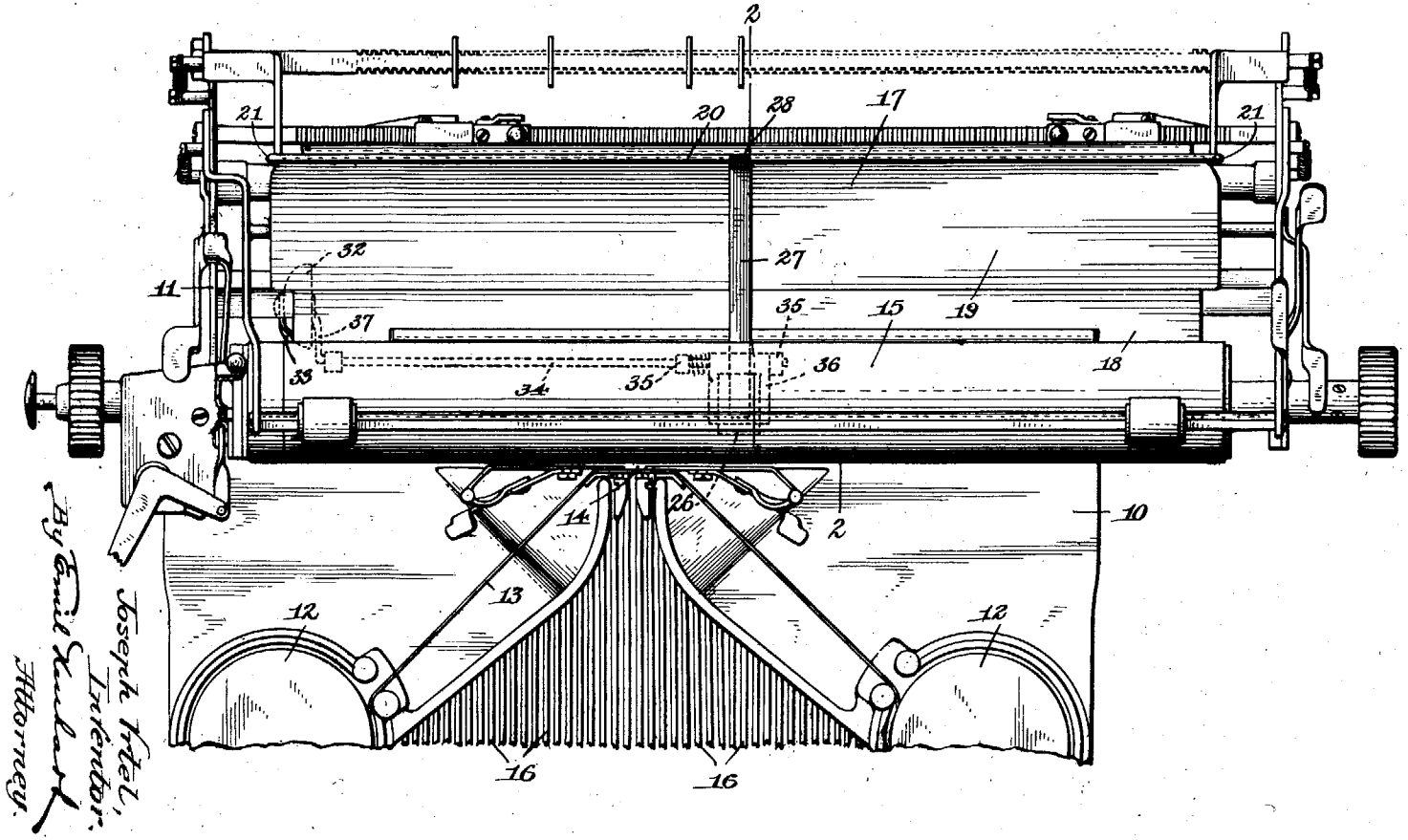
Fig. 1 is a top plan view of the rear portion of a standard form of typewriter showing my improved invention applied thereto.

Fig. 3 is an enlarged transverse section taken through the platen of the typewriter shown in Fig. 1, and the paper guide having my improved invention applied thereto, the parts of my invention being shown in the positions they normally assume, with a sheet of paper partly introduced into the typewriter, the sheet being shown in a position just prior to causing flexing of the controller element of my device.

Fig. 4 is a partial view similar to Fig. 3 showing the paper advanced between the paper guide and the platen or roller, with the controller element of my device flexed.

Fig. 5 is a broken rear view of portions of the paper guide showing portions of the adjusting element of my device in connection therewith.

Figure 6:
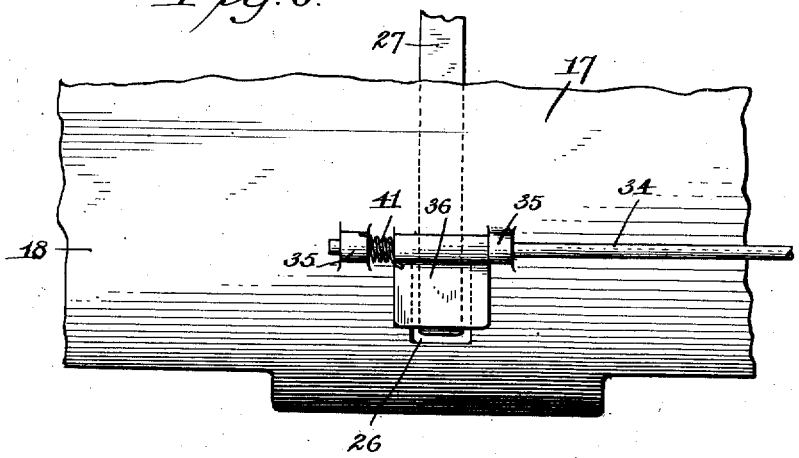

Fig. 6 is a bottom plan view of a portion of the paper guide or deflector and portions of my improved signaling device in association therewith.

Figure 7:
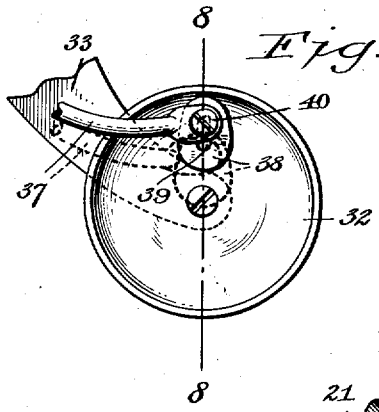

Fig. 7 is a view of the bell employed as a signal, shown in association with part of the signal-actuating mechanism and part of the support for the bell, the striker arm and head being in the positions they assume in their approach to sound the alarm.

Figure 8:
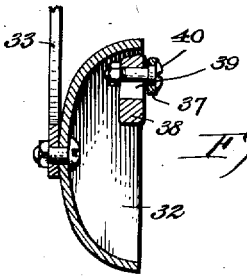

Fig. 8 is a vertical section taken on line 8—8, Fig. 7.

Figure 9:
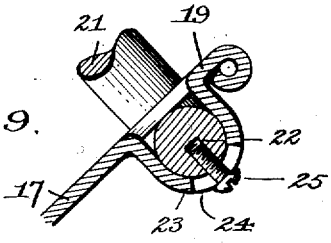

Fig. 9 is an enlarged transverse section taken on line 9—9, Fig. 5.

In the drawings, 10 designates the body or frame of the typewriter or machine on which is mounted the movable carriage-frame 11. 12 are the ribbon spools around which the ribbon 13 is coiled in the usual manner and conveyed to the printing point 14 to be forced against the platen or roller 15 by the type carried at the outer end of the type bars 16; the ribbon 13 being of course advanced in the usual manner. The platen or roller 15 is rotatably arranged within the movable carriage frame 11, and although in Fig. 1 I have illustrated various levers and other elements for proper manipulation of the machine, these vary in different machines and are not dependable upon my device for proper operation, nor is my device dependable for proper operation upon these levers and other elements. However, it is necessary that a paper guide, of the general type shown at 17, be employed, and this is so associated with the platen or roller 15 that it guides the paper to and around the roller; and any guide or deflector serving such purpose may be utilized in connection with my improved signaling device. As clearly shown in Fig. 3, this guide is formed in two sections, 18, 19; the section 18 having a part curved to conform to the platen or roller and such part being in closely spaced relation to the latter; the remainder of this section being directed upwardly and rearwardly from the lower region of said platen or roller. The section 19 is adapted to be swung away from the section 18 for the purpose of permitting access to the parts of the typewriter beneath the same. This guide is one common form now in use, and although it consists of two relatively movable parts, such parts may at all times be maintained in the position shown in Fig. 3. The guide may, however, be formed of one integral piece and is so constructed in several makes of machines, or it may be otherwise formed in accordance with the various types of paper guides now in use.

This paper guide, like the platen or roller 15, is supported by the movable carriage-frame 11, which is caused to travel back and forth over the body or main frame 10 in the usual manner, and since it is the primary object of my invention to enable my improved page-end signaling device to be applied to any make of typewriter, I have, in preferred form, constructed the signaling device and the paper guide as a single unit of the machine. For this reason all parts of the signaling device are shown supported by the paper guide.

Included in the signaling device is an oscillatory carrier bar 20, which may be referred to as the adjusting element, and which is normally positioned above the paper guide at or near its upper end. In the form shown, this bar is of somewhat greater length than the paper guide and at opposite ends has rearwardly extending side arms 21 which are rebent underneath or in rear of the paper guide to form pivot elements 22 serving as centers for the carrier bar 21. These pivot elements are journaled in loops 23 stamped from the paper guide, the latter being slit near each end to enable the metal between the slits to be bulged rearwardly to form the loops 23, serving as bearings. One of each set of loops is provided with a slot 24 through which a set screw 25 is passed that takes into the pivot element journaled therein. Therefore, when the heads of the set screws 25 are tightened against the slotted loops, the pivot elements 22, and consequently the carrier bar 20, will be maintained in any adjusted position. By loosening the set screw, assuming the parts to be in the position shown in Fig. 3, the side arms 21 may be swung upwardly and rearwardly, or downwardly and forwardly, with the result that the carrier-bar 20 will be correspondingly adjusted.

The carrier bar 20 is spaced from the front or outer face of the paper guide so that the paper to be written upon may be inserted into the machine in the usual manner without any interference on the part of the carrier bar or its supports.

The paper guide is provided with an opening 26 adjacent the platen or roller 15, preferably directly beneath the same and midway between the ends of the guide. This location of the opening may be varied, but since the bearing of the paper against the platen or roller is equalized at opposite sides of the opening if centrally located in the paper guide, I have found this central location of the opening to be most satisfactory.

The carrier bar 20 is slit diametrically in the plane of the opening in the paper guide, and a comparatively long resilient element 27 serving as a controller element has one end inserted into the slit so formed and retained by clamping the controller element to the carrier bar at this point as at 28. This controller element is in the form of a comparatively thin resilient strip, somewhat narrower than the opening 26 in the paper guide, and extends downwardly across the path of a sheet of paper fed around the platen between the paper guide and the platen, its free end extending through said opening 26.

The last-mentioned end of said resilient strip is feathered to reduce the thickness of the same along the region of said opening, to render the same sensitively flexible, and to guard against unduly bulging the sheet of paper introduced into the machine. So fashioned, the free end of the controller strip will, however, retain its inherent resiliency to exert sufficient pressure to cause movement of a pivoted element with which it is designed to engage when retrieving its normal form after being flexed.

It may here be stated that a sheet of paper *a* to be typewritten upon is placed between the paper guide and platen or roller in the usual manner, and when this paper lies in contact with the front or outer face of said paper guide, as shown in Fig. 3, the flexible controller strip 27 will lie in front of it with the free terminal of said strip extending down through the opening 26, while in contact with the guide or deflector at the rear wall of said opening. When moving the paper downwardly along the guide, the lower edge thereof will be grasped by the platen or roller when rotated and be forcibly advanced to come in contact with the under or rear face of the controller strip 27 and as this strip is quite flexible along this region of contact, further rotation of the platen or roller 15 will cause the paper to be fed underneath and around the roller and the paper will, during this movement, cause the feathered or sensitively flexible end portion of the controller strip to assume the curvature of the platen or roller and that portion of the paper guide directly beneath said platen or roller, as shown in Fig. 4. When in this position, no portion of the controller strip extends through the opening 26 in the paper guide, and this condition of the parts is maintained during the progressive feeding of the paper around the roller until a line region of the paper is reached in close proximity to the lower edge of the latter.

With the adjustable carrier bar positioned as shown in Fig. 3, this line region will be approximately one and three-eighths inches above the lower edge of the paper sheet. As clearly shown in Fig. 3, the feathered free extremity of the controller strip is slightly forward of a plane extending vertically through the axis of the platen or roller 15, as indicated by the line 29. Upon swinging the adjustable carrier bar 20 rearwardly along the arc of the circle, designated 30 in said figure, the feathered free extremity of said controller strip will be moved towards or in rear of the vertical plane indicated by the line 29, depending on the degree of movement rearwardly of said carrier bar. Forward and downward movement of said carrier bar along the arcuate line 30 will move the feathered free extremity of said controller strip forward and downward to a greater degree than shown in Fig. 3. Thus the movement of the carrier bar governs the extent to which the controller strip is passed through the opening 26 in the paper guide, and this extent or degree of projection through said opening also governs the relation of the feathered free end of said strip to the vertical plane indicated by line 29. Thus, when a sheet of paper is placed in the machine and the feathered free end portion of said controller strip is flexed upwardly by the paper to conform to the formation of the platen or roller, the distance between the free end of said controller strip and the printing plane, indicated by line 31, determines the distance of the last line to be written on a sheet from the lower edge of the sheet, and this distance of course will vary according to the adjustment given the carrier bar 20.

The feathered end of the controller strip will spring outwardly through the opening 26 in the paper guide as the lower edge of the sheet of paper clears the same, and in the snap action resulting therefrom on the part of the controller strip, it is designed to actuate the signal forming part of my improved invention and illustrated as a bell, designated 32, which I prefer to attach directly to the paper guide, but which may, if desired, be secured to the movable carriage frame in which the paper guide is mounted and with which it is movable. However, since it is my intention that the invention be applied to the paper guide in such a manner that it forms a unit therewith, the attachment of the bell to the guide has advantages over the arrangement wherein it may be secured to the movable carriage-frame.

In the preferred form, I provide the paper guide at one end thereof with a bracket 33 to which the bell 32 is secured, and interpose signal-actuating mechanism between this bell and the feathered end of the controller strip 27. This signal-actuating mechanism comprises a pivot rod 34 journaled to rock in bearings 35 stamped from or secured to the paper guide or protector, said pivot rod being parallel with the platen or roller 15 and being preferably located adjacent the rear end of the opening 26 in the paper guide. For this purpose two bearings 35 are disposed in planes at opposite sides of the opening 26, and between these two mentioned bearings an actuator 36 is arranged, it being secured to said pivot rod 34 and normally extending downwardly and forwardly therefrom. As illustrated, this actuator is in the form of a flat member lying underneath the opening 26 in the paper guide and being somewhat wider than said opening. Thus located, the feathered free end of the controller strip 27 snaps downwardly through the opening 26 when released from the lower edge of a sheet of paper passing through the machine and forcibly engages the actuator 36, causing the same to be swung downwardly so as to rock the pivot bar 34, which extends from this actuator to that end of the paper guide at which the bell 32 is located. At such point it is provided with a lateral arm 37, which may be termed a striker arm and which extends rearwardly and terminates in a plane passing diametrically through the bell 32. The outer or free end of said striker arm has a striker head 38 mounted thereon which is vertically movable on the end of said striker arm and within the bell, and for this purpose is provided with a slot 39 through which and said striker arm a screw bolt 40 is passed, the screw bolt being shouldered to allow free action of said striker head on the end of the striker arm. This striker head is adapted to engage the bell when the pivot rod 34 is actuated, and it may be of sufficient weight to maintain the striker arm in its lowermost position, which would result in the actuator 36 being maintained in its uppermost position. I, however, prefer to employ a spring 41 adjacent the actuator 36, the spring being coiled around the pivot rod 34 with one end thereof secured to the paper guide and the other end fastened to or bearing against the actuator so as to maintain said actuator in elevated position, as shown in Fig. 4, and said hammer head 38 in its lowered position, as indicated by dotted lines in Fig. 7. Thus it will be apparent that when the feathered free end of the controller strip 27 snaps outwardly through the opening 26 under its inherent resiliency, it will cause a quick action of the actuator 36 from the position shown in Fig. 4 to that shown in Fig. 3, and this quick action is transferred to the hammer head 38 of the signaling device with the result that the striker arm 37 moves quickly from the dotted position shown in Fig. 7 to that shown in full lines, and under this quick action the momentum imparted thereby to the striker head 38 will cause said head to travel outwardly independent of the movement of the striker arm after the latter reaches the end of its range of travel and cause the sounding of the bell with a clear tone to notify the operator that the sheet is completed with the desired margin left at the bottom of the same; the margin of course being in accordance with the adjustment made by the carrier bar 20.

It will be apparent from the foregoing that my device may be applied to typewriting machines in the course of their construction, and that it may also be applied to any make of typewriter now in use, since such machines are constructed so that the paper guide is detachable from the remaining parts of the machine. Since this invention is especially designed for application to a paper guide, any form or type of guide may be provided with an opening, such as shown at 26 in the drawings, and with suitable means to journal the pivot rod and support the bell, thereby enabling one, under the mere substitution of one paper guide for another, to equip the machine with my invention.

While such a unit embodying a paper guide and my improved signaling device is of decided advantage, due to its ready installation to any type of machine now in use, it will be apparent that parts of my device may be mounted or supported separately from the paper guide, yet retain the inventive thought involved herein and certain advantages which the unitary structure described possesses.

While I have illustrated and described an audible signal and have shown such a singal in the form of a bell, it is understood that any other means of signaling the operator upon approaching the lower edge of a sheet may be employed, and that the feathered free end of the controller strip 27 and the actuator 36 serve as contactors. They may be caused to contact to effect an electric circuit and illuminate an electric bulb, colored or otherwise, which may also be carried on the paper guide or deflector, or be otherwise mounted and fall fully within the scope of the appended claims.

Having thus described my invention, what I claim is:

1. The combination with a typewriter platen, of a paper guide associated therewith and having an opening therethrough, a flexible strip secured to said paper guide a distance from said opening and having a free end extending through said opening, said flexible strip enabling the introduction of a sheet of paper between the same and said guide and upon feeding of the paper between the guide and said platen causing the free end of said strip to be positioned between said sheet and said platen, said flexible strip being adapted to snap outwardly through said opening as the lower edge of the paper passes the same, a signal, a signal actuator adjacent said opening adapted to be engaged by said controller strip under its snap action through said opening, and means between said signal actuator and said signal to cause a signal to be given.

2. The combination with a tpewriter platen, of a paper guide associated therewith and having an opening therethrough directly beneath said platen and an upward and rearward extension, a flexible controller strip secured at its upper end to said extension and extending downwardly therefrom in the plane of said opening and normally having its free end extending through said opening, said flexible strip being caused to move upwardly through said opening upon introduction of a sheet of paper between said platen and guide and under its inherent resiliency snap outwardly through said opening when the lower edge of the paper passes beyond the free end of said strip, a pivot rod rockably mounted on said paper guide parallel with said platen, an actuating element secured to said pivot rod underneath the opening in said paper guide and adapted to be engaged and actuated by said flexible strip under the snap action of the free end thereof, a striker arm extending angularly from said pivot rod at the distant end thereof, and a bell associated with said striker arm adapted to be struck under actuation of the latter upon movement of said pivot rod.

3. The combination with a typewriter platen, of a paper guide associated therewith and having an opening therethrough directly beneath said platen, a flexible controller strip secured at its upper portion to said paper guide and extending downwardly therefrom in the plane of said opening with its lower free end portion normally passed through said opening, said free end portion being caused to move upwardly through said opening upon introduction of a sheet of paper between said platen and said paper guide and under its inherent resiliency snap downwardly through said opening when the lower edge of said sheet passes beyond the free end of said strip, a pivot rod rockably mounted parallel with said platen, an actuating element secured to said pivot bar to extend underneath the opening in said paper guide and adapted to be engaged and actuated by said flexible strip under the snap action of the free end thereof, a bell, means between said pivot rod and said bell to cause the latter to be sounded upon actuation of said pivot rod, and a spring acting to maintain said actuating element in elevated position.

4. The combination with a typewriter platen, of a paper guide associated therewith and having an opening therethrough directly beneath said platen, a carrier bar oscillatably mounted on said paper guide, a controller strip secured at one end to said carrier bar and at its other end extending through said opening as a free end, said controller strip having said free end sensitively flexible and adapted to extend varying distances through said opening according to the adjustment of said carrier bar, the free end of said controller strip being adapted to be flexed upwardly through said opening upon introduction of a sheet of paper between said platen and said paper guide and to flex outwardly under snap action when the lower end of a sheet of paper passes said free end, and means for actuating a signal having an element adapted to be engaged by the free end of said strip when snapping outwardly through said opening.

5. The combination with a typewriter platen, of a paper guide associated therewith and having an opening therethrough adjacent said platen, a carrier bar extending across said paper guide at the upper end and having angular arms at opposite ends and angular pivot elements at the outer ends of said arms parallel with said bar, said pivot elements being journaled for rocking movement on said guide to cause arcuate movement of said carrier bar, a controller strip secured at one end to said carrier bar and extending downwardly and forwardly therefrom with its other end passed through said opening, said controller strip having at least said last-mentioned end sensitively flexible and adapted to extend varying distances through said opening according to the adjustment of said carrier bar, the sensitively flexible end of said controller strip being adapted to be flexed toward said platen upon introduction of a sheet of paper between said platen and said paper guide and to flex outwardly under snap action when the lower edge of a sheet of paper passes said sensitively flexible end, and means for actuating a signal having an element adapted to be engaged by the sensitively flexible end of said strip when snapping outwardly through said opening.

6. The combination with a typewriter platen having its printing region along a given plane thereof, of a paper guide associated therewith and having an opening therethrough in spaced relation to said printing region, a comparatively long flexible controller strip secured to said paper guide at a point spaced from said opening and having a free terminal normally extending through said opening and adapted to be flexed toward said platen upon introduction of a sheet of paper between the latter and said paper guide, the extreme end of said free terminal having a definitely spaced relation to the plane of said printing region, said flexed free terminal being adapted to snap outwardly through said opening when the lower edge of said sheet of paper passes the same, and a signal device having a part in the path of said terminal caused to be actuated when the latter snaps outwardly through said opening.

7. The combination with a typewriter platen having its printing region along a given plane thereof, of a paper guide associated therewith and having an opening therethrough in spaced relation to said printing region, a flexible controller strip secured at one end to said paper guide and having its other end sensitively flexible and normally extending through said opening, said sensitively flexible end being flexed inwardly through said opening upon introduction of a sheet of paper between said platen and said paper guide and adapted to spring outwardly under its inherent resiliency after the sheet of paper clears the same, a signal, and an element adjacent said opening engaged by said sensitively flexible end to cause a signal to be given when said sensitively flexible end snaps outwardly.

8. The combination with a typewriter platen, of a paper guide associated therewith and having an opening therethrough adjacent said platen, a flexible strip secured at one end to said paper guide and having its other end free and extending normally through said opening, said flexible strip being positioned to permit the introduction of a sheet of paper between the same and said paper guide and extending lengthwise in the direction of the travel of the sheet of paper around said platen, the free end of said flexible strip being adapted to spring outward through said opening as the lower end of the sheet of paper passes the same, and signaling means having a part adjacent said opening to be engaged by the free end of said flexible strip and cause a signal to be given at the moment the lower edge of said sheet of paper passes beyond said flexible strip.

9. The combination with a typewriter platen, of a paper guide associated with said platen and extending below and around and close to the lower portion thereof and having an opening therethrough below said platen, a carrier bar extending across the paper guide in rear of the platen and spaced above the upper face of the paper guide, means for supporting said bar at its ends to provide a free space extending across the paper guide between it and the paper guide for introduction of sheets of paper, a narrow controller strip secured at its upper end to said carrier bar and extending lengthwise in the direction of the travel of a sheet of paper to and around said platen, with its free lower end normally extending through said opening and across the path of a sheet of paper fed to and around the platen, said controller strip having said free end thin and sensitively resilient to adapt it to be flexed upwardly through said opening by the edge of a sheet of paper as said sheet is fed around the platen and to be caused to conform to the curvature of the platen upon movement of said sheet of paper under said strip and between said paper guide and said platen forwardly beyond the front edge of said opening, and to spring outwardly and downwardly when the lower edge of said sheet of paper in its forward movement passes said upwardly flexed free end, and means for actuating a signal having an element adapted to be engaged by the free end of said strip in its outward movement through said opening.

10. The combination with a typewriter platen, of a paper guide associated therewith and having an opening therethrough adjacent said platen, a carrier bar extending across the paper guide in rear of the platen and spaced above the upper surface of the paper guide, means for supporting said bar at its ends to provide a free space extending across the paper guide for the introduction of sheets of paper, a flexible resilient strip secured at one end to said carrier bar and having its other end free and normally extending through said opening in the paper guide, said flexible and resilient strip being positioned to permit the introduction of a sheet of paper between the same and said paper guide and extending across the path of the said sheet and lengthwise in the direction of the travel of the said sheet toward and around said platen, and adapted to be flexed upwardly and curved to closely conform to the curvature of the platen by said sheet of paper as it is fed around the platen, the free end of said resilient strip being adapted to spring outward through said opening as the lower end of the sheet of paper passes the same, and signaling means having a part adjacent said opening to be engaged by the free end of said flexible strip and cause a signal to be given at the moment the lower edge of said sheet of paper passes beyond said flexible strip.

11. The combination with a typewriter platen, of a paper guide associated with said platen and extending below and around and close to the lower portion thereof and having an opening therethrough below said platen, a carrier bar extending across the paper guide in rear of the platen and spaced above the upper surface of the paper guide, a narrow controller strip secured at its upper end to said carrier bar and extending lengthwise in the direction of the travel of a sheet of paper to and around said platen, with its free lower end normally extending through said opening and across the path of a sheet of paper fed around the platen, said controller strip having its free end thin and sensitively resilient to adapt it to be flexed upwardly through said opening by the edge of a sheet of paper as said sheet is fed around the platen, and to be caused to conform to the curvature of the platen upon movement of said sheet of paper under said strip and between said paper guide and said platen forwardly beyond the front edge of said opening, and to spring outwardly and downwardly when the lower edge of said sheet of paper in its forward movement passes said upwardly flexed free end, means for adjustably supporting said controller strip for longitudinal adjustment to extend its free end varying distances through said opening, and means for actuating a signal having an element adapted to be engaged by the free end of said strip in its outward movement through said opening.

12. The combination with a typewriter platen, of a paper guide associated therewith and having an opening therethrough beneath said platen, a carrier bar extending across the paper guide in rear of the platen and spaced above the paper guide, means supporting said bar for adjustment to vary its distance from the platen, means to secure said bar in its adjusted position, a controller strip secured at its upper end to said carrier bar with its lower free end extending through said opening, said controller strip having said free end sensitively flexible and adapted to extend varying distances through said opening according to the adjustment of said carrier bar, the free end of said controller strip being adapted to be flexed upwardly through said opening upon introduction of a sheet of paper under said strip and between said platen and said paper guide, and to flex outwardly and downwardly under snap action when the lower end of a sheet of paper passes said free end, and means for actuating a signal having an element adapted to be engaged by the free end of said strip when snapping outwardly through said opening.

13. The combination with a typewriter platen, of a paper guide associated therewith and having an opening therethrough adjacent said platen, a carrier bar extending across said paper guide at the upper end thereof and having angular arms at opposite ends and pivot elements at the outer ends of said arms, journals for said pivot elements supporting said carrier bar for rocking movement to cause arcuate movement of said carrier bar toward and from the platen, a controller strip secured at one end to said carrier bar and extending downwardly and forwardly therefrom with its other end passed through said opening, said controller strip having at least said last-mentioned end sensitively flexible and adapted to extend varying distances through said opening according to the adjustment of said carrier bar, the sensitively flexible end of said controller strip being adapted to be flexed toward said platen upon introduction of a sheet of paper under said strip and between said platen and said paper guide, and to flex outwardly and downwardly under snap action when the lower edge of a sheet of paper passes said sensitively flexible end, and means for actuating a signal having an element adapted to be engaged by the sensitively flexible end of said strip when snapping outwardly through said opening.

14. The combination with a typewriter platen, of a paper guide associated therewith and extending under the platen and having an opening therethrough below said platen, a flexible resilient narrow thin strip extending lengthwise in the direction of the travel of the sheet of paper to and around said platen, with its lower end free and extending across the path of a sheet of paper fed around the platen, and through said opening in the paper guide, said flexible and resilient strip being positioned to permit the introduction of a sheet of paper between the same and said paper guide and adapted to be flexed upwardly and curved to conform to the curvature of the platen by said sheet of paper as it is fed along the paper guide below and partway around the platen, the free end of said resilient strip being adapted to spring outward through said opening as the lower end of the sheet of paper passes the same, means on the carriage for supporting the upper end of said resilient strip in rear of the platen and above the upper surface of the paper guide, and signaling means having a part adjacent said opening to be engaged by the free end of said flexible strip and cause a signal to be given at the moment the lower edge of said sheet of paper passes beyond the free end of said flexible strip.

15. The combination with a typewriter platen, of a paper guide associated therewith and extending under the platen and having an opening therethrough below said platen, a flexible resilient narrow thin strip extending lengthwise in the direction of the travel of the sheet of paper to and around said platen, with its lower end free and extending across the path of a sheet of paper fed around the platen, and through said opening in the paper guide, said flexible and resilient strip being positioned to permit the introduction of a sheet of paper between the same and said paper guide and adapted to be flexed upwardly and curved to conform to the curvature of the platen by said sheet of paper as it is fed along the paper guide below and partway around the platen, the free end of said resilient strip being adapted to spring outward through said opening as the lower end of the sheet of paper passes the same, means on the carriage for supporting the upper end of said resilient strip in rear of the platen and above the upper surface of the paper guide, a pivot rod rockably mounted parallel with said platen, an actuating element secured to said pivot bar to extend underneath the opening in said paper guide and adapted to be engaged and actuated by said flexible strip under the snap action of the free end thereof, a bell, and means between said pivot rod and said bell to cause the latter to be sounded upon actuation of said pivot rod.

JOSEPH VRTEL.